Aug. 14, 1928.
O. O. RIESER
1,680,954
MECHANISM FOR MAKING BATTERY BOX HANDLES
Filed June 18, 1926    2 Sheets-Sheet 1
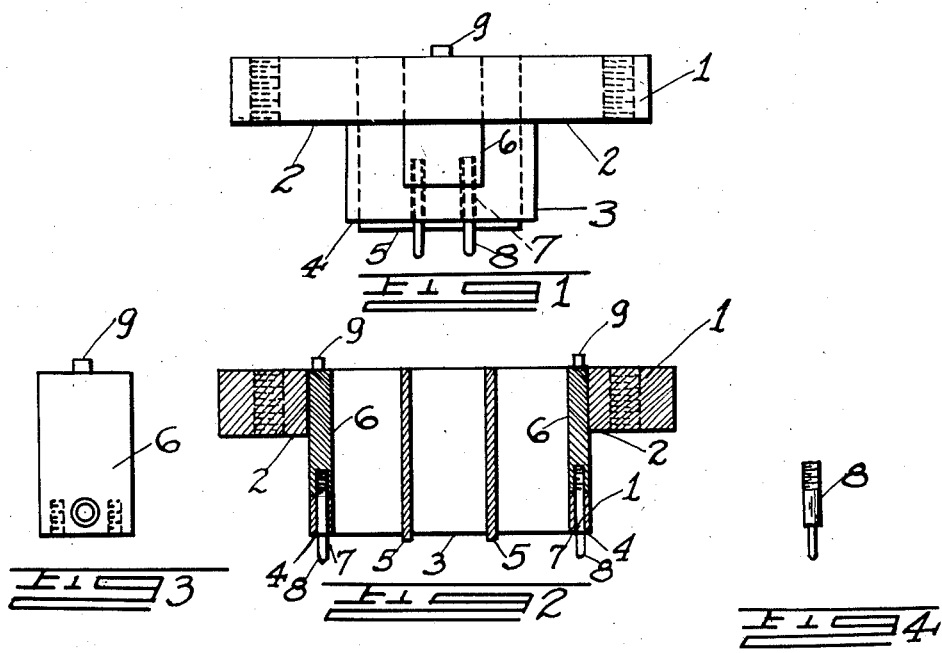
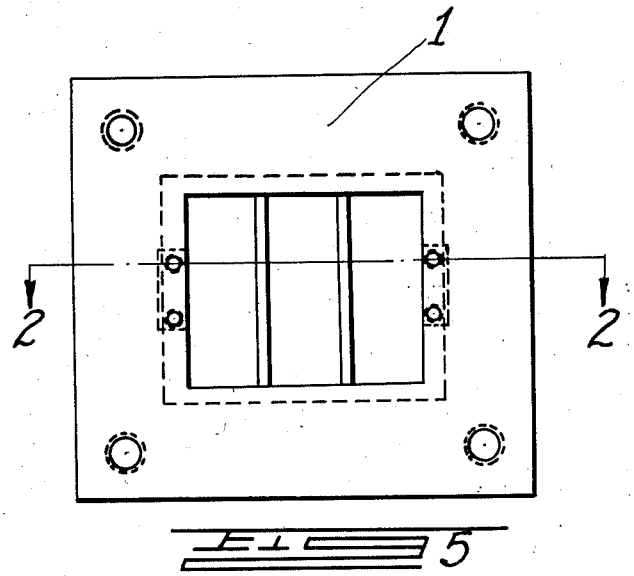
INVENTOR.
Oliver O Rieser
BY
Allen & Allen
ATTORNEY.

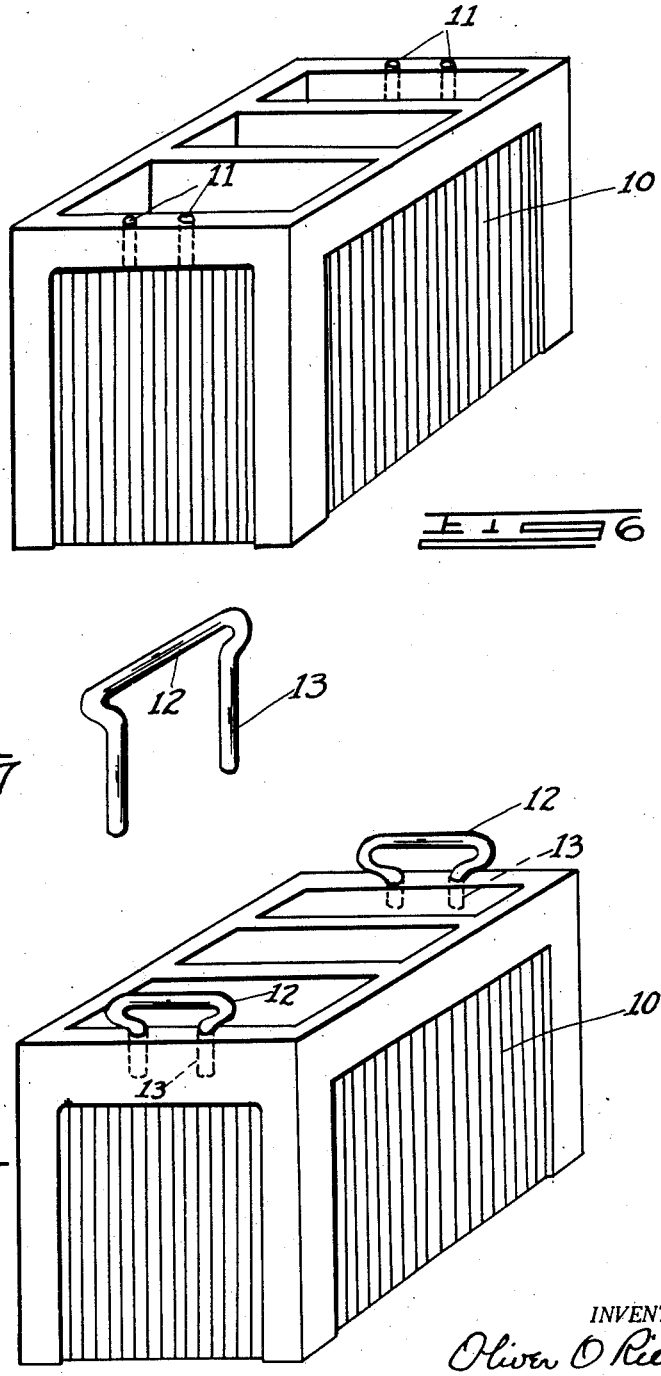

Patented Aug. 14, 1928.

1,680,954

UNITED STATES PATENT OFFICE.

OLIVER O. RIESER, OF OAK PARK, ILLINOIS, ASSIGNOR TO THE RICHARDSON COMPANY, OF LOCKLAND, OHIO, A CORPORATION OF OHIO.

MECHANISM FOR MAKING BATTERY-BOX HANDLES.

Application filed June 18, 1926. Serial No. 116,995.

My invention relates to handles for battery boxes particularly such boxes as are made of asphaltic material as the process of securing the handles within the boxes depends essentially on the molding of the boxes prior to the insertion of the handles.

It is the object of my invention to provide mechanism for molding battery boxes which as an initial step will provide co-operating means which when the handles are applied in accordance with my novel process will result in a very useful combination of box and handle.

Thus specifically it is my object to provide mechanism and a process of molding battery boxes in which the boxes will have suitable apertures in the side walls thereof. It is further my object to provide a process for uniting suitable handles in the molded boxes, the handles being securely fastened within the apertures.

Referring to the drawings in which I have illustrated my novel mechanism and examples showing the several steps in the process of manufacture:

Figure 1 is an end elevation of the assembly of the stripping plate and die for forming boxes with handle holes in the side walls thereof.

Figure 2 is a vertical sectional view of the assembly illustrated in Figures 1 and 5, taken along the lines 2—2 in Figure 5.

Figure 3 is a side elevation of the hole molding die.

Figure 4 is a side elevation of the pin which is secured within the die illustrated in Figure 3.

Fgure 5 is a top plan view of the stripping plate and die assembly.

Figure 6 is a perspective view of a battery box molded with the mechanism illustrated in Figures 1-5.

Figure 7 is a perspective view of my preferred type of handle.

Figure 8 is a perspective view of the completed box made in accordance with my novel process.

The mechanism with which I mold handle holes in the side walls of a battery box is closely associated with the battery box molding apparatus described in the Robert Holz application Serial #635,548, filed April 30, 1923, to which reference is hereby made. In this application mechanism consisting of a top male mold, a stripping plate, and a bottom female mold is described. Further, in the Robert Holz application, Serial #635,549, filed April 30, 1923, the process of making battery boxes using the mechanism described in the first mentioned application is disclosed. My present invention preferably employs similar mechanism and employs the steps carried out in the process application with additional equipment and a further step in the molding process which enables me to manufacture boxes with handles in an inexpensive and satisfactory manner.

The process of molding battery boxes comprises a female mold which is filled with plastic material having an asphaltic content. A stripper plate is adapted to extend partially within the female mold so as to mold the top edges of the walls of the box. The stripper plate has rectangular orifices through which the male mold is moved to compress the material into a box having sectional compartments for the cells of the battery. In removing the molded box the stripper plate and male mold are elevated together for a certain distance. A stop then limits the further elevation of the stripper plate and the male mold then moves out of the sectional compartments leaving the completed box.

In the drawings a stripper plate is indicated generally at 1. The stripper plate has sides 2 which extend over the top of the female mold. Vertical walled portions 3 extend within the female mold, the bottom edges 4 outlining the top edges of the walls of the molded box and the bottom edges 5 the top edges of the walls of the cells.

I have provided in addition to the usual male mold which is not shown as it forms no part of this invention, the pin plates 6 which slide within the walls of the stripper plate as indicated in Figure 2. Apertures 7 in the stripper plate provide means by which pins 8 which are secured into the pin plates may extend through the portions of the stripper plate which outline the top edges of the molded box. Thus positive alignment of the holes which the pins make in the side walls of the box is assured. The pin plates may have lugs 9 as shown by which they may be secured to the press platen. I have shown two pins mounted in each plate but it will be obvious that more than this number of pins may be used if more holes are required.

As a step in the molding process I move the pin plates downwardly coincident with the pressing of the box 10 so that apertures 11 are molded in the side walls of the box.

I then provide preferably metallic handles 12 having depending portions 13 which fit within the holes formed by the pins 8. After the box is molded I coat the depending portions of the handles with asphaltic cement and force them into the apertures 10. The finished box as illustrated in Figure 8 is thus provided with suitable carrying handles which obviously may have exterior portions of any desired shape.

Having thus described my invention what I claim as new and desire to secure by Letters Patent is:—

1. Mechanism for molding battery boxes comprising a stripper plate having holes therein adjacent top walls of a molded box, and male dies shaped so as to slide within said holes, said dies shaped and of sufficient length so as to form handle sockets in side walls of a battery box.

2. In combination with battery molding apparatus a stripper plate adapted to form top edges of the walls of a box and means adapted to be extended through said stripper plate to form handle sockets in said walls.

3. In combination with container molding apparatus consisting of a female mold, a male mold, and a stripper plate member which outlines the top walls of the container, means adapted to be aligned in and to extend beyond the outlining surface of said stripper plate member for forming seats for handles in the walls of the container.

OLIVER O. RIESER.